(12) United States Patent
Sinitsyn et al.

(10) Patent No.: US 8,495,248 B2
(45) Date of Patent: Jul. 23, 2013

(54) METHOD OF SYNCHRONIZING A DATA PROCESSING DEVICE WITH A DATA PROCESSING SYSTEM

(75) Inventors: Alexander Sinitsyn, Eindhoven (NL); Wilhelmus Franciscus Johannes Fontijn, Eindhoven (NL); Steven Broeils Luitjens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 452 days.

(21) Appl. No.: 12/742,960

(22) PCT Filed: Nov. 17, 2008

(86) PCT No.: PCT/IB2008/054813
§ 371 (c)(1),
(2), (4) Date: May 14, 2010

(87) PCT Pub. No.: WO2009/066229
PCT Pub. Date: May 28, 2009

(65) Prior Publication Data
US 2010/0262716 A1    Oct. 14, 2010

(30) Foreign Application Priority Data
Nov. 20, 2007 (EP) ..................... 07121101

(51) Int. Cl.
*G06F 15/16* (2006.01)
(52) U.S. Cl.
USPC ............ 709/248; 709/201; 709/217; 709/218
(58) Field of Classification Search
USPC .................. 709/201, 217, 218, 248
See application file for complete search history.

(56) References Cited

U.S. PATENT DOCUMENTS

| | | | | |
|---|---|---|---|---|
| 6,052,588 A | * | 4/2000 | Mo et al. ...................... | 455/430 |
| 7,020,690 B1 | * | 3/2006 | Haitsuka et al. .............. | 709/217 |
| 2003/0140088 A1 | * | 7/2003 | Robinson et al. ............. | 709/202 |
| 2003/0227989 A1 | * | 12/2003 | Rhee et al. .................... | 375/376 |
| 2004/0202206 A1 | | 10/2004 | Lee | |

FOREIGN PATENT DOCUMENTS

WO    2005119463 A2    12/2005

OTHER PUBLICATIONS

Koukia et al: The Role of Context in M-Commerce and the Personalization Dimension; Proceedings of the 2006 IEEE/WIC/ACM International Conference on Web Intelligence and International Agent Technology Workshops, Dec. 2006, pp. 267-276.

Sinitsyn: "A Synchronization Framework for Personal Mobile Servers"; Proceedings of the Second IEEE Annual Conference on Pervasive Computing and Communications Workshops (PERCOMW'04), Mar. 2004, pp. 208-212.

(Continued)

*Primary Examiner* — Liangche A Wang

(57) ABSTRACT

A method of synchronizing a data processing device (9-11) with a data processing system (1) to which the data processing device (9-11) has an intermittent connection, includes determining a first context based on variable data (30). A second context, valid over a longer term than the first context, is determined based on further data (28). Both the first and the second context are used to control a synchronization process during which data is communicated between the data processing device (9-11) and the data processing system (1), and which results in at least one of them obtaining a target set of data (31,32,33). The target set of data is determined in such a way that its composition is based on both the first and the second context.

21 Claims, 2 Drawing Sheets

OTHER PUBLICATIONS

Pauty et al: "Research Challenges in Mobile and Contex-Aware Service Development"; Department of Computer Science, K.U. Leuven, Leuven, Belgium, 11 Page Document, Apr. 2006.

Sinitsyn, A.: "Preference-Based Synchronization"; Personal Infotainment Companion (pic) Project Power Point Presentation, Philips Research, Mar. 2003, 16 Page Document.

* cited by examiner

METHOD OF SYNCHRONIZING A DATA PROCESSING DEVICE WITH A DATA PROCESSING SYSTEM

FIELD OF THE INVENTION

The invention relates to a method of synchronizing a data processing device with a data processing system to which the data processing device has an intermittent connection.

The invention also relates to a control system for controlling a process of synchronization of a data processing device with a data processing system to which the data processing device has an intermittent connection.

The invention also relates to a computer programme.

BACKGROUND OF THE INVENTION

WO 2005/119463 discloses a method of transferring content between a first storage device and a second storage device, the first storage device being selectively connectable to the second storage device. The known method includes determining an order of priority for the content which requires transfer and transferring the content according to the determined order of priority. A transfer initiation unit detects when transfer should occur, and initiates the transfer process. The unit causes a "create transfer data set" unit to begin constructing a set of data that needs to be transferred between the devices. A transfer strategy control unit organizes the data set created by the unit into a particular order of priority. A particular transfer strategy can be selected based on the context in which the device or the user is in and stored usage data which has been acquired by logging usage of the system (by the user) over a period of time. Information about the context (e.g. environment in which the device is in) is provided by an external unit or by a user manually indicating where they intend next to use the device. A sub-system acquires sensory data and other information to derive the context information needed to realize this functionality.

A consequence of the organization of the known system is that, particularly where the process of transfer is not interrupted so that the order of the data has no effect, inappropriate data may be transferred.

SUMMARY OF THE INVENTION

It is an object of the invention to provide an alternative method and system of synchronizing a data processing device with a data processing system, with the aid of which the data processing device is able to obtain at least data essential to its subsequent use in an efficient manner.

This object is achieved by the method according to the invention, which includes:
  determining a first context based on variable data,
  determining a second context, valid over a longer term than the first context, based on further data, and
  using both the first and the second context to control a synchronization process during which data is communicated between the data processing device and the data processing system, and which results in at least one of them obtaining a target set of data, wherein the target set of data is determined in such a way that its composition is based on both the first and the second context.

By determining the target form of the set of data in such a way that its composition is based on both the first and the second context, the composition can be tailored such that a set of only data likely to be relevant is assembled for use in synchronizing the data processing device. Because both the first and the second context are used, and the second context is valid over a longer term than the first context, both planning constraints and rapidly varying circumstances influence the composition of the set of data to be synchronized to. This increases the likelihood that only the relevant data is included. Moreover, it allows for efficient short-term adaptation of sets of data that are assembled over a longer period of time in dependence on the second context.

In an embodiment of the method, the first context includes a set of at least one parameter value, continually updated on the basis of measurement data from at least one sensor.

An effect is that a suitable first, short-term context is used, which context can be kept current in an automated manner.

In an embodiment, the first context includes information on at least one of:
  a state of a user associated with the data processing device;
  a state of an environment of a user associated with the data processing device;
  a state of the data processing device;
  a state of an environment of the data processing device;
  a state of the data processing system;
  properties of a connection between the data processing device and the data processing system; and
  a state of an environment of the data processing system.

An effect of using information on a state of a user is to be able to determine a mood or condition of a user from which to infer which data are likely to be called up during use of the data processing device. An effect of using information on a state of the data processing device is to be able to assess which data the data processing device is likely to be able to process. An effect of using information on a state of the data processing system or an environment of the data processing system is to assess the circumstances under which the connection between the data processing device and the data processing system is made or likely to be made, so that the possibilities for and requirements of data transfer at that time can be inferred. An effect of using information on properties of a connection between the data processing device and data processing system, is to tailor the composition of the set of data to what can be transferred in the available time and using the available bandwidth, for instance.

An embodiment of the method includes determining the second context based at least partly on recorded data.

Recorded data is less likely to be of a rapidly varying nature, so that it is suited to determining a long-term context.

An embodiment of the method includes selecting the further data based on target time information and time information recorded with the recorded data.

An effect is to be able to use historical data and data relating to planned future events to determine the composition of the target form of the set of data.

An embodiment includes:
  receiving an identification of a user of the data processing device, and
  determining the second context based at least partly on data linked to the identification of the user.

An effect is to be able to take account of the fact that a single user may process the same type of data using multiple devices (e.g. play back music either on a portable audio player or on his mobile phone). In particular the second context becomes more relevant to the needs of the user of the data processing device if it is also based on data relating to the user in his capacity of user of further devices.

An embodiment of the method includes controlling a process of transferring the data communicated between the data processing device and the data processing system in dependence on both the first and the second context.

An effect is to be able to prepare sets of data of which the data processing device is to receive a copy even in circumstances where transfer of such sets is not yet practicable.

A variant includes selecting the data processing device from among a plurality of devices available for transfer of data from the data processing system in dependence on both the first and the second context.

This variant takes account of situations in which a user has various devices with intermittent connections to the data processing system, to determine whether transfer to a particular data processing device is possible or desirable in view of current circumstances, as determined by the first context, and longer-term circumstances, as determined by the second context.

A further variant includes determining at least a point in time at which to transfer the communicated data in dependence on both the first and the second context.

This variant takes account of situations in which the data processing device is not in a state that is suitable for synchronization. The long-term context is suitable for determining patterns including intervals during which transfer is appropriate. The short-term context is suitable for determining whether the current point of time lies on such an interval.

According to another aspect, the control system according to the invention includes:
an input for obtaining variable data, wherein the control system is configured to determine a first context based on the variable data; and
an input for obtaining further data, wherein the control system is configured to determine a second context, valid over a longer term than the first context, based on further data,
wherein the control system is configured to use both the first and the second context to control a synchronization process during which data is communicated between the data processing device and the data processing system, and which results in at least one of them obtaining a target set of data, and wherein
the control system is configured to cause the target set of data to be determined in such a way that its composition is based on both the first and the second context.

The control system is capable of ensuring in an efficient manner that appropriate data is used for synchronization.

In an embodiment, the control system is configured to carry out a method according to the invention.

According to another aspect of the invention, there is provided a computer programme including a set of instructions capable, when incorporated in a machine-readable medium, of causing a system having information processing capabilities to perform a method according to the invention.

BRIEF DESCRIPTION OF THE DRAWINGS

The invention will be explained in further detail with reference to the accompanying drawings, in which.

DETAILED DESCRIPTION

Figure 1:
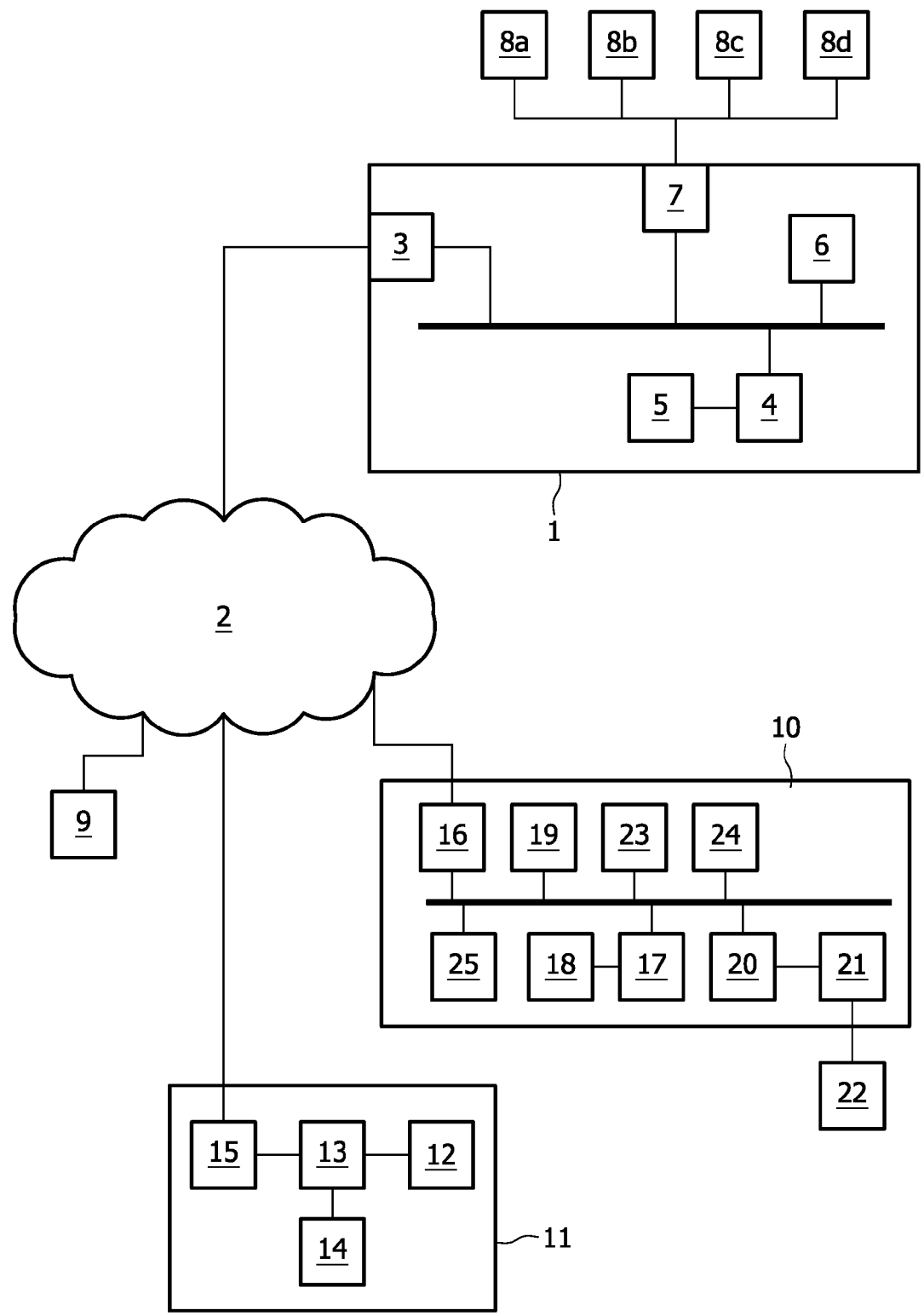
FIG. 1 illustrates in schematic fashion a home area network into which devices comprised in a body area network of a user have been introduced.

In a setting used by way of example to explain a variant of a synchronization method, a home server 1 is connected to a home area network 2 via a network interface 3. The home area network 2 can be based on any known standard, including IEEE 408.11x, USB, Firewire, WiMax, Zigbee, etc. In the illustrated embodiment, it is a wireless network. The devices connected to it can for example communicate using the UPnP (Universal Plug and Play) protocols.

The home server 1 includes a data processing unit 4 and main memory 5 for executing software. It further includes a mass storage device 6 for recording operating data and storing content data such as audio files, video files, files used by personal information management applications, e-mails exchanged by certain users, profiles of such users for use by operating systems of data processing devices, etc.

In another embodiment, the home server 1 additionally has access to data stored on a further networked device, e.g. a server connected to the Internet.

The illustrated home server 1 further includes a sensor interface 7 for receiving data from a plurality of sensors 8a-d. The sensors 8 are arranged to monitor a local environment of at least the home server 1, but preferably the environment in which the home area network 2 is operative. Examples of parameters to be monitored include temperature, lighting, humidity, visibility, etc.

A user entering the home can carry a plurality of devices. By way of example, a mobile phone 9 (not shown in further detail), portable audio player 10 and personal health monitor 11 are shown.

The personal health monitor 11 includes a body sensor 12 for measuring a parameter indicative of the physical state of the user wearing the device. It can measure blood pressure, body temperature or the like. The personal health monitor 11 further includes a data processor 13, memory 14 (such as a solid-state memory device) and a network interface 15 for establishing a connection to the home area network 2.

The portable audio player 10 includes a similar network interface 16, as well as a central processing unit 17 and main memory 18. Data representative of audio tracks are stored in a mass storage device 19, e.g. a solid-state memory device or hard disk drive unit. A digital signal processor 20 and audio amplifier 21 and earphones 22 form a system for rendering the data stored in the mass storage device 6. A user can enter commands via a user interface 23, e.g. a touch screen device. An internal sensor 24 monitors the state of the portable audio player 10, for example the state of charge of its battery (not shown). The audio player 10 also includes a sensor 25 for monitoring extraneous conditions, e.g. temperature, lighting conditions, motion, etc.

In an embodiment, the portable audio player 10 maintains a user profile for each user, including a history of audio tracks rendered for that user. The audio tracks are preferably ordered into play lists associated with the user. The play lists are obtained from the home server 1. This allows the portable audio player 10 to receive new play lists that are automatically generated on the basis of external data. It also allows the user to have the same play lists at his disposal when using either of the portable audio player 10 or the mobile phone 9 to play back audio tracks.

Figure 2:
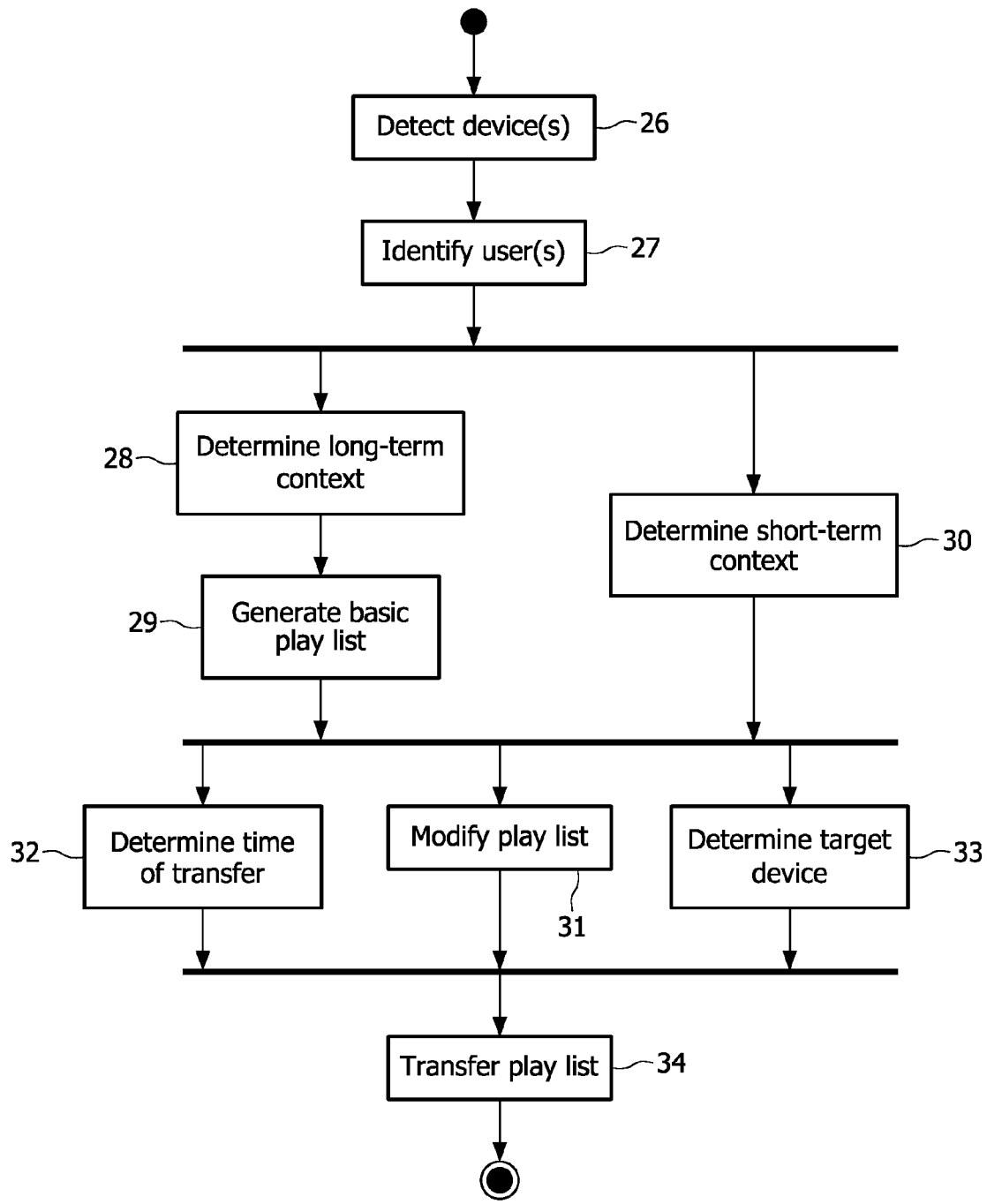
FIG. 2 illustrates a method of synchronizing devices comprised in the body area network with a home server in the home area network.

Referring to FIG. 2, the home server 1 executes software to synchronize the user's devices with the data maintained on the home server 1. First (step 26), the home server 1 discovers the presence of one or more of the user's devices upon establishment of a connection between these devices and the home area network 2. The UPnP protocols, for example, allow the home server to discover the user's devices or for the user's devices to announce their presence. In other embodiments, the portable audio player 10 is put in a docking station or cradle (not shown). In that case, the home server 1 detects that the portable audio player 10 has been placed in its docking station.

In a next step 27, the home server 1 communicates with the mobile phone 9, personal health monitor 11 and portable audio player 10 to obtain an identification of the user currently logged in on these devices. In another embodiment, this step 27 entails obtaining identifications of all potential users of the devices, so that all their play lists can be downloaded and all their profiles updated.

To prepare a play list, the home server 1 determines a long-term context (step 28) based at least partly on data recorded on the mass storage device 6. The long-term context is based on data linked to the identification of the user, in that it comprises an analysis of at least one of a user's diary, a user's to do list, a user's recorded listening habits (play counts, favorites, etc.). The long-term context is further determined on the basis of invariant data associated with the target device or devices, e.g. the capacity of the mass storage device 19 of the portable audio player, the fidelity of the sound rendered by the digital signal processor 20 and audio amplifier 21, etc.

The user's recorded listening habits in one embodiment include data recorded with time information, e.g. which tracks are listened to at which times of the day, on which days of the week, or during which seasons of the year. The user's to do list and diary also comprises information recorded with time information, but this time relating to future events. In particular, it will identify the activities the user will be engaged in at certain future points in time. Where, for example, a daily play list is prepared, target time information (the target time being the time interval corresponding to the coming day) is used to select the appropriate data from the recorded data, and then analyzed to determine the relevant long-term context.

The long-term context is used to prepare a basic play list (step 29). In another variant, the steps 28,29 are carried out in the background even before the devices of the user have been detected. Indeed, basic play lists for each of a plurality of different user devices could be prepared in the background at a time convenient to the home server 1, e.g. at night.

The home server 1 also determines a short-term context (step 30). The short term context includes the current values of parameter values continually updated on the basis of measurement data from at least one of the sensors 8, 12, 24, 25.

The short-term context includes information on the state of the user for whom the play list is to be provided. The state of the user can be based on an analysis of data from the body sensor 12, e.g. the body temperature, blood pressure or heartbeat of the user to determine the mood the user is in, whether he is agitated and thus likely to be in a hurry, etc. The state of the user can also include the user's location, which may be determined using data from the mobile phone 9 (likely to be carried on the user's person).

The short-term context may also or alternatively be based on the state of an environment of the user, the user's devices and/or the home server 1, e.g. using data from the sensors 8 for monitoring the local environment.

The short-term context may also or alternatively be based on the state of the portable audio player 10, e.g. the state of charge of the battery as determined by the internal sensor 24. A fully charged state may be an indication that the user is about to leave with the device, or that a longer play list can be played back, for example. The short-term context may also or alternatively be based on the state of the other devices used by the user. For example, if the user has left his mobile phone 9 in a charger, he is not likely to leave the home area network 2 in the near future.

The home server 1 modifies (step 31) the basic play list generated in the preceding step 29 on the basis of the short-term context, by adding and/or removing audio tracks from the basic play list. As a result, the play list is prepared such that its composition is based on both the determined long-term context (relatively invariable) and the short-term, variable context. The play list's composition is based on audio tracks available at the home server 1 for inclusion in the play list, e.g. because they have been stored in the mass storage device 6 or are available to the home server 1 over a network connection. At least this aspect (preparation of the play list) of the synchronization is therefore controlled using both the short-term and long-term context.

Further aspects of the synchronization process can also be controlled on the basis of both the short-term and long-term context, as illustrated in FIG. 2. In particular, the home server 1 controls the process of transferring the prepared play list on the basis of both the short-term and the long-term context. On the one hand, it determines (step 32) at least a point in time at which to commence (or re-commence) transfer of the prepared set of data in dependence on both the short-term and long-term context. The short-term and long-term context are used to determine when there will be sufficient time to carry out the transfer and/or to complete a transfer already commenced. On the other hand, the home server 1 determines (step 33) which of the user's devices is be synchronized based on the short-term and long-term context. It may, for example, deduce that the portable audio player is not likely to be used on the day for which the play list was prepared, but that the mobile phone 9 will be used. This would affect both the composition of and the target device for the play list.

Finally, the play list is transferred (step 34) to the target device at the point in time determined as appropriate.

It should be noted that the embodiments described above illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Although the synchronization has been described as a method of preparing and transferring a set of data from the home server to the portable audio player 10, it can equally be used to prepare and transfer a set of data for synchronizing the home server 1 with, for example, the personal health monitor 11. In another embodiment, each of a plurality of devices in the home area network 2 provides synchronization data which results, when transferred to the portable audio player 10, in the audio player obtaining a set of data in a target form. In effect, the network of devices constitutes a data processing system with which the portable audio player 10 is synchronized.

The invention claimed is:

1. Method of synchronizing a user's data processing device with data maintained on a data processing system to which the user's data processing device has an intermittent connection, including:
   determining by the data processing system, a first context based on parameter values continuously updated in substantially real-time on the basis of sensor measurement data,
   receiving at the data processing system an identification of the user of the data processing device,
   obtaining by the data processing system data linked to the identification of the user and invariant data associated with the user's data processing device,
   determining by the data processing system, a second context, valid over a longer term than the first context, based partially on said data linked to the identification of the user and in part on said invariant data associated with the user's data processing device,
   using both the first and the second context to control a synchronization process during which data is communicated between the data processing device and the data processing system, and which results in at least one of the data processing device or the data processing system obtaining the target set of data, wherein the composition of the target set of data is based on both the first and the second context.

2. Method according to claim 1, wherein the first context includes a set of at least one parameter value, continually updated on the basis of measurement data from at least one sensor.

3. Method according to claim 1, wherein the first context includes information on at least one of:
   a state of a user associated with the data processing device;
   a state of an environment of a user associated with the data processing device;
   a state of the data processing device;
   a state of an environment of the data processing device;
   a state of the data processing system;
   properties of a connection between the data processing device and data processing system; and
   a state of an environment of the data processing system.

4. Method according to claim 1, including determining the second context based at least partly on recorded data.

5. Method according to claim 1, including selecting the further data based on target time information and time information recorded with the recorded data.

6. Method according to claim 1, including:
   receiving an identification of a user of the data processing device.

7. Method according to claim 1, including controlling a process of transferring the data communicated between the data processing device and the data processing system in dependence on both the first and the second context.

8. Method according to claim 7, including selecting the data processing device from among a plurality of devices available for transfer of data from the data processing system in dependence on both the first and the second context.

9. Method according to claim 7, including determining at least a point in time at which to transfer the communicated data in dependence on both the first and the second context.

10. Control system for controlling a process of synchronization of a data processing device with a data processing system to which the data processing device has an intermittent connection, which control system includes:
   an input for obtaining parameter values, wherein the control system is configured to determine a first context based on said parameter values which are continuously updated in substantially real-time on the basis of sensor measurement data; and
   an input for obtaining data linked to the identification of the user and invariant data associated with the user's data processing device, wherein the control system is configured to determine a second context, valid over a longer term than the first context, based on the data linked to the identification of the user and invariant data associated with the user's data processing device,
   wherein the control system is configured to use both the first and the second context to control a synchronization process during which data is communicated between the data processing device and the data processing system, and which results in at least one of the data processing device or the data processing system obtaining a target set of data, wherein the control system is configured to cause the composition of the target set of data to be based on both the first and the second context.

11. Control system for controlling a process of synchronization of a data processing device with a data processing system to which the data processing device has an intermittent connection, which control system includes:
   an input for obtaining parameter values, wherein the control system is configured to determine a first context based on said parameter values which are continuously updated in substantially real-time on the basis of sensor measurement data; and
   an input for obtaining data linked to the identification of the user and invariant data associated with the user's data processing device, wherein the control system is configured to determine a second context, valid over a longer term than the first context, based on the data linked to the identification of the user and invariant data associated with the user's data processing device,
   wherein the control system is configured to cause the composition of the target set of data to be based on both the first and the second context, configured to carry out a method according to claim 1.

12. Computer program including a set of instructions capable, when incorporated in a machine-readable medium, of causing a system having information processing capabilities to perform a method according to claim 1.

13. Method according to claim 1, wherein said data linked to the identification of the user comprises a user's diary.

14. Method according to claim 1, wherein said data linked to the identification of the user comprises a user's to-do list.

15. Method according to claim 1, wherein said data linked to the identification of the user comprises a user's recorded listening habits.

16. Method according to claim 1, wherein said sensor senses a physical state of the user.

17. Method according to claim 1, wherein said sensor senses a state of an environment of the user.

18. Method according to claim 1, wherein said sensor senses a state of the user's data processing device.

19. Method according to claim 1, wherein said sensor senses the state of charge of a battery of the user's data processing device.

20. Method according to claim 1, wherein said sensor senses the state of the data processing system.

21. Method according to claim 1, wherein said sensor senses properties of a connection between data processing device and the data processing system.

* * * * *